(12) United States Patent
Noeske et al.

(10) Patent No.: US 7,095,807 B2
(45) Date of Patent: Aug. 22, 2006

(54) METHOD FOR DECODING BIPHASE SIGNALS

(75) Inventors: Carsten Noeske, Glottertal (DE); Matthias Vierthaler, Freiburg (DE); Thomas Hilpert, Denzlingen (DE)

(73) Assignee: MICRONAS GmbH, Freiburg (DE)

( * ) Notice: Subject to any disclaimer, the term of this patent is extended or adjusted under 35 U.S.C. 154(b) by 699 days.

(21) Appl. No.: 10/178,774

(22) Filed: Jun. 24, 2002

(65) Prior Publication Data

US 2002/0196872 A1 Dec. 26, 2002

(30) Foreign Application Priority Data

Jun. 23, 2001 (EP) ................. 01 115 255

(51) Int. Cl.
*H03D 3/22* (2006.01)
*H04L 27/22* (2006.01)

(52) U.S. Cl. ............... 375/330; 375/331; 375/333; 714/758; 714/760

(58) Field of Classification Search ........... 375/329, 375/333, 330, 282, 280, 284, 291, 316, 326, 375/342, 348, 349; 714/758, 760
See application file for complete search history.

(56) References Cited

U.S. PATENT DOCUMENTS 4,078,159 A * 3/1978 Lender et al. ............... 375/214

(Continued)

FOREIGN PATENT DOCUMENTS

| EP | 0360770 | 8/1989 | |
|----|---------|--------|---|
| EP | 0803999 | 4/1997 | |
| EP | 0912010 | 9/1997 | |
| EP | 0647023 | 5/2001 | ............ 11/4 |

OTHER PUBLICATIONS

Keen-Keong Yan, "Sidelobe reduction in array-pattern synthesis using genetic algorithm", IEEE, Transaction on Antennas and Propagation, Jul. 1997, vol. 45, issue 7, pp. 1117-1122.*

(Continued)

*Primary Examiner*—Jean B. Corrielus
*Assistant Examiner*—Qutub Ghulamali
(74) *Attorney, Agent, or Firm*—O'Shea, Getz & Kosakowski, P.C.

(57) ABSTRACT

A technique of decoding erroneous biphase signals is disclosed comprising the following steps. First, phase and magnitude sample values (ps, bs) are formed, from which a first digital signal (d1) is derived. From this, associated bit combinations (St1, St2; Stp) are determined, and a decision is made as to whether the respective bit combination (St1, St2; Stp) is a valid combination (Sg1, Sg2; Sgp) or an erroneous one (Sf1, Sf2; Sfp). Probability values (Sw1, Sw2; Swp) are determined that decide which parts of the erroneous bit combination (Sf1, Sf2; Sfp) are probably true and/or which are probably false. Next, a corrected bit combination (Sk1, Sk2; Skp) is formed from the existing information. Finally, a second digital signal (d2) is generated as an output signal, whose data states are formed either from the valid bit combination (Sg1, Sg2; Sgp) or from the corrected bit combination (Sk1, Sk2; Skp).

20 Claims, 3 Drawing Sheets

U.S. PATENT DOCUMENTS

| | | | |
|---|---|---|---|
| 4,086,566 A * | 4/1978 | Lender | 714/810 |
| 5,475,705 A | 12/1995 | Dent | 375/333 |
| 5,771,296 A | 6/1998 | Unemura | 381/28 |
| 5,923,766 A | 7/1999 | Oda | 381/98 |
| 6,442,218 B1 * | 8/2002 | Nakamura et al. | 375/340 |
| 6,456,718 B1 | 9/2002 | Aarts | 381/61 |
| 6,778,613 B1 * | 8/2004 | Avidor et al. | 375/329 |
| 6,834,109 B1 * | 12/2004 | Pare et al. | 379/416 |

OTHER PUBLICATIONS

Kwan-Cheng Chen et al: "Analysis of SCCL as a PN-Code Tracking Loop," IEEE Transactions on Communications, IEEE Inc.; New York, pp. 2942-2946.

* cited by examiner

| Stp | | Stp | | Stp | | Swp | | Skp | |
|---|---|---|---|---|---|---|---|---|---|
| $bs_0$ | $bs_{-1}$ | $St_0$ | $St_{-1}$ | Diff | | $Sw_0$ | $Sw_{-1}$ | $Sk_0$ | $Sk_{-1}$ |
| 0.,9 | 0.35 | 1 | 1 | +0.55 | >0 | 1 | X | 1 | 0 |
| 0.6 | 0.8 | 1 | 1 | −0.2 | <0 | X | 1 | 0 | 1 |
| 0.85 | 0.2 | 0 | 0 | +0.65 | >0 | 0 | X | 0 | 1 |
| 0.25 | 0.75 | 0 | 0 | −0.5 | <0 | X | 0 | 1 | 0 |

*FIG. 3*

METHOD FOR DECODING BIPHASE SIGNALS

BACKGROUND OF THE INVENTION

This present invention relates to the field of signal decoding, and in particular to decoding of biphase signals by which digital information is transmitted.

The bits of the original digital information are encoded prior to transmission, and then transmitted as "symbols". A transmission technique using biphase signals is Binary Phase-Shift Keying (BPSK). To reduce the bandwidth requirement for the transmission of these digital signals, Nyquist filters are used at the transmitter and receiver ends for pulse regeneration and signal recovery. The steep pulse edges are replaced by slowly rising transition curves provided with overshoot, whereby undesired harmonics are largely suppressed. In the limiting case, rather than a pulse signal, a bell-shaped signal with overshoot whose zero crossings are defined by constant symbol intervals T is transmitted. The frequency requirement in such a transmission is about twice as high as the data rate to be transmitted. Nevertheless, a reliable distinction between "1" and "0" states is ensured at the sampling instants, because the individual symbols are shifted in time with respect to each other by integral multiples of T and because the zero crossings all coincide.

European Patent Application EP-A 0 912 010 discloses a typical receiver for digitally transmitted signals that incorporates such Nyquist filters. To distinguish between the logic states of the individual symbols, a sampling control loop is provided that optimizes the sampling instant for the individual symbols (timing recovery).

A property of digital signals may be that the digital states of the signal to be transmitted are not uniformly distributed. At the transmitter and receiver ends, this may have an effect like a superimposed dc level, which is undesirable in many cases. This can be remedied using suitable coding techniques. Each bit to be transmitted is transmitted by a balanced bit combination, with the original state value being encoded via the sequence of associated bits. Such coding techniques can also be used in an interleaved scheme, or be combined with other coding methods.

Biphase coding is used, for example, to transmit additional digital information in a radio broadcast signal. This additional information is known as a Radio Data System (RDS) signal. In many countries RDS transmits specific information to motorists within predetermined FM stereo broadcast channels. With the digital RDS signal, a 57-kHz subcarrier locked to a 19-kHz pilot signal is modulated by a double modulation. The biphase coding replaces a logic "0" by the combination "0, 1", and a logic "1" by the combination "1, 0". Each logic state of the original data sequence thus generates two successive bits, which are referred to as a bit combination or symbol pair. This type of biphase coding ensures that a symbol change occurs in each symbol pair, so that the data clock can be relatively easily recovered from the received data sequence.

At the receiver, the 57-kHz biphase signal is synchronously downconverted to baseband and band-limited by digital signal processing. As the biphase signal is basically a phase modulation of the 57-kHz carrier, it is also possible to use a complex vector analysis. Theoretically, this provides a rotating vector that comes to rest after the mixing at 57 kHz. A carrier/phase recovery circuit rotates the complex vector to the real axis, so that imaginary components are no longer present. A Cordic algorithm may then be used, for example, to determine phase and magnitude.

At the sampling instants on the symbol rate, the phase is ideally determined by two states, whereas the magnitude should be constant. In reality, these theoretical states are only approximated, and they are additionally falsified by interference signals. From the phase values obtained, the two logic states "0" or "1" are decided and a corresponding bit sequence is formed. From this bit sequence, two-bit groups are formed that must have a bit change in accordance with the coding at the transmitter end. The formation of the two-bit loops may be based on recognition that during the formation of the groups, the number of unallowable symbol pairs in the form of "0, 0" and "1, 1" groups becomes a minimum. In a last step, each two-bit group is assigned either a logic "0" or a logic "1", whereby the original data sequence is restored at the receiver. However, due to transmission errors, there are erroneous groups with "0, 0" and "1, 1" states.

Therefore, there is a need for a system and method of detecting and correcting transmission errors in biphase signals, so that satisfactory data transmission is ensured even in the presence of heavy interference.

SUMMARY OF THE INVENTION

The bit sequence obtained during decoding is checked to determine how the reliabilities of the individual bits, and the probabilities that the logic states of the individual bits are true or false. A reliability or probability value is formed from the available magnitude values of the biphase signals. The transmission errors as such are readily detectable by the absence of the bit change in the two-bit combination.

A comparison of the instantaneous vector lengths for the bit combination in question allows a statement to be made about the reliability or probability of the detected states. If an interference signal is superimposed on the biphase signal, some of the instantaneous magnitude and/or phase values may be increased from the theoretical values, some may be reduced. The evaluation will, of course, become unreliable primarily where the signal values and the interference signal act in opposite senses because the resulting difference signals may become very small or even result in a change of sign. Accordingly, more reliable statements and evaluations are possible with relatively large signals, while relatively small signals may entail uncertainties. If a bit combination contains an error, the probability that the greater magnitude values indicate the true state and the smaller ones indicate the false state is high. The comparison is made, for example, by determining the difference between the digitized vector lengths if the latter are present as absolute values. Instead of the absolute-value generation, which is simple in the two's complement system commonly used in signal processing, squared vector lengths may be used for obtaining the difference. The input values for the decoding process may also be the output signals from a Cordic demodulator. Such Cordic demodulators are being used increasingly for demodulating phase- and/or amplitude-modulated signals. One output of the Cordic demodulator provides the instantaneous phase value of the resultant vector, and the other output provides the instantaneous absolute value. With real-valued modulation techniques, such as in the case of the biphase signal, the amplitude output will provide the absolute sample value, and the phase output will provide the positive or negative sign. Whether the individual functional units for carrying out the probability check and the decoding are implemented in software, in hardware, or in a combined form or are also used for other tasks is immaterial to the invention.

These and other objects, features and advantages of the present invention will become more apparent in light of the following detailed description of preferred embodiments thereof, as illustrated in the accompanying drawings.

BRIEF DESCRIPTION OF THE DRAWING

FIG. 3 is a table for forming a corrected bit combination.

DETAILED DESCRIPTION OF THE INVENTION

Figure 1:
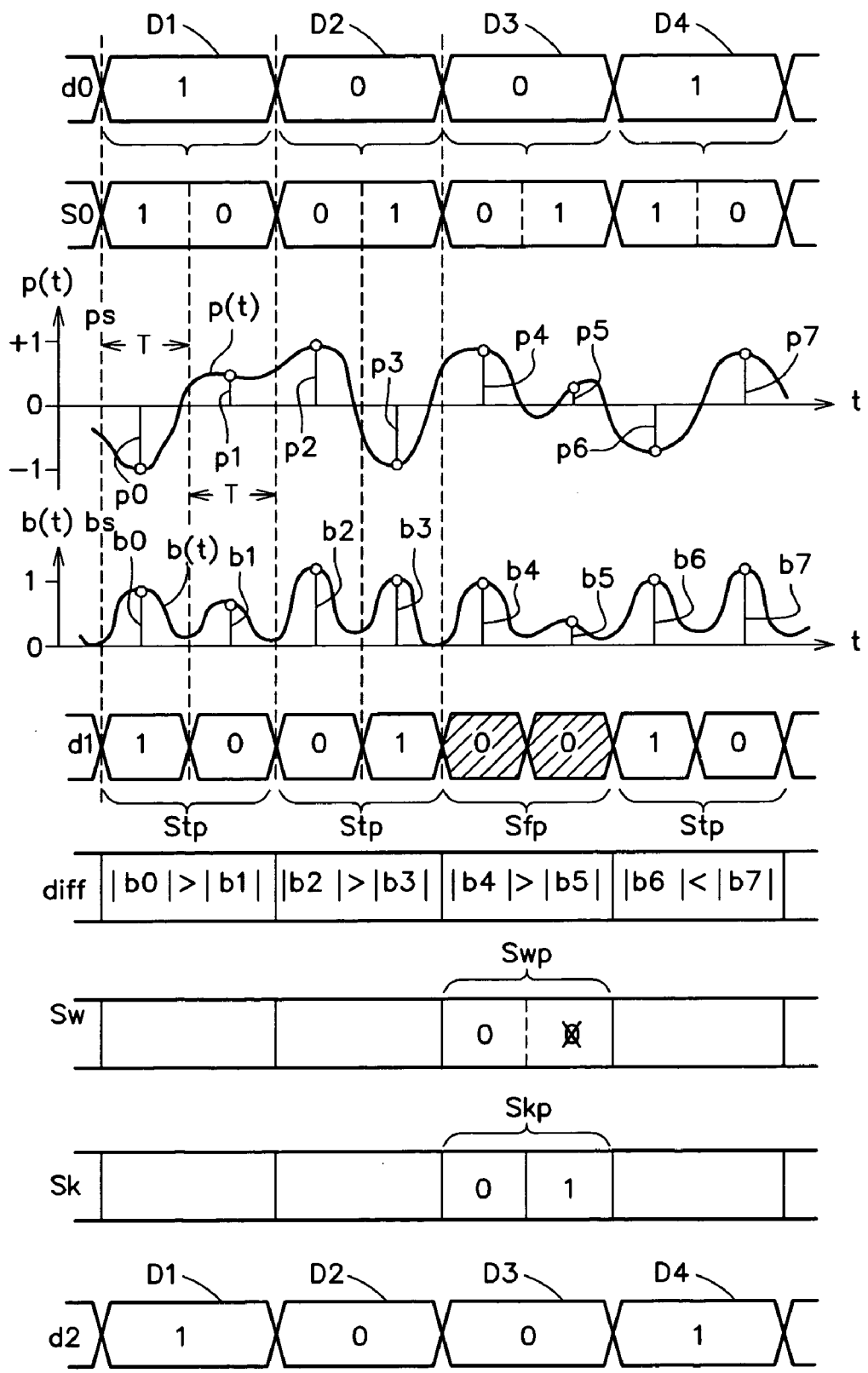
FIG. 1 is a schematic timing diagram illustrating a decoding method.

In the timing diagram of FIG. 1, the data signal and sampling sequences of a signal section from D1 to D4 that are associated with one another are shown one below the other. As a result of transmission errors, the bit sequence is received at the receiver partly in error. By an example it will be shown how this error can be corrected at the receiver in accordance with the invention, whereby the original data sequence is restored.

The first line shows the original digital signal d0 with the original data D1, D2, D3, and D4, which are assigned the logic state values "1", "0", "0", and "1", respectively. In order that, on a time average, the transmission path remains dc-level-free even in the presence of the most different digital signal sequences d0, a new data sequence S0 in which this freedom from dc is forced for each original bit is formed from the original data sequence d0. In the second line, each of the original bits is assigned a bit combination Stp which is dc-level-free in itself. In the simplest case, each original bit is supplemented with its complementary bit. The original "1" state is thus replaced by the states "1, 0". Analogously, the original "0" state is replaced by the bit combination "0, 1". A known application of biphase coding, as mentioned above, is in specific stereo broadcast signals. At the receiver end, the original data "1" or "0" can be unambiguously inferred from the detection of a "1, 0" or "0, 1" bit sequence, respectively.

The transition between the individual states is not abrupt, of course, but continuous. The waveform at the receiver corresponds approximately to the phase signal p(t) of the third line and to the magnitude signal b(t) of the fourth line. To reduce the bandwidth required for the transmission of the digital signals, the data edges are rounded and thus contain few harmonics.

Preferably, Nyquist filters, with which the bandwidth requirement can be greatly reduced, are used at the transmitter and receiver ends. If the correct sampling instant is hit, a single sample value ps of the phase signal p(t) will suffice to detect the logic state of the associated bit or symbol. In this way, the phase sample values p0 to p7 are obtained. According to the vector representation, these sample values should be located at 0 (i.e., 360) degrees and +/−180 degrees. In radians, these are the values 0 (i.e., 2π) and +/−π. Which of these phase values is assigned to logic "1" and logic "0" is arbitrary. In line 3, the phase positions of the phase signal p(t) normalized with p are given at the ordinate −1 and +1, with the ordinate value 0 corresponding to a mean phase position. In the embodiment, the phase range from −1 to 0 is assigned to the logic "1" state, and the phase range from 0 to +1 is assigned to the logic "0" state.

The fourth line shows the waveform of the magnitude signal b(t) of the resultant vector for the biphase signal prior to the decimation to the symbol rate. Since the biphase signal is theoretically a real-valued signal, which takes on only the discrete values +1 and −1 on the real axis, the magnitude would have to change between the values 0 and 1. To determine the reliability or probability of the individual parts of an erroneous bit combination, according to an aspect of the invention, the magnitude signal b(t) is sampled to form the magnitude sample values b0, b1, b2 to b7. Sampling takes place synchronously with the formation of the phase sample value ps.

The phase sample values ps show that a sign change of the phase sample values occurs within the first, second, and fourth bit combinations, but not in the third bit combination with the sample values p4 and p5. Due to superposition of interference signals, these two sample values are positive (i.e., they both correspond to the logic "0" state). The fifth line shows a first digital signal d1, which corresponds to the signs of the individual phase sample values p0 to p7. If the sample value ps was negative, this is represented by "1"; if the sample value was positive, this is represented by "0". The associated bit combinations Stp are marked by braces. The third bit combination shows an erroneous bit combination Sfp; it is additionally set off by hatching.

The sixth line Diff shows the comparison of the magnitude sample values bs within the successive bit combinations Stp. The comparison is made via the sample values b0 to b7. The result is indicated by the mathematical symbol ">" or "<". In one embodiment it will be shown later that the comparison is implemented by a subtraction, whose resultant sign is subsequently processed as a positive or negative result of the comparison. As long as the bit combinations obtained are allowed symbol pairs, the implementation of the comparison is of no further significance. Things are different in the case of the erroneous bit combination Sfp, however, where the two phase sample values p4, p5 are positive, so that both signal a logic "0" state. According to an aspect of the invention, by evaluating the magnitude sample values b4, b5, a distinction becomes possible. The greater one of the two magnitude sample values is likely to indicate the true information, and the smaller magnitude sample value is likely to indicate the false information.

The probability assessment of the erroneous bit combination Sfp is illustrated schematically by the bit sequency Sw of the seventh line. In this probability sequence Sw, only the third bit combination Swp is of interest, because its information is of significance for the erroneous bit combination Sfp. Of this bit combination Sfp, the first "0" state is probably valid, and the second "0" state is probably false. A corrected bit combination Skp with "0, 1" can thus be readily found. This is shown in the eighth line with the corrected bit sequence Sk. The contents of the first, second, and fourth bit combinations in the corrected bit sequence Sk are of no significance. However, for the evaluation it may be expedient, that the bit combinations Stp of the first digital signal d1, which were detected as being valid, are present in the corrected bit sequency Sk and thus are readily accessible to the evaluating facility.

The ninth line shows the result of the decoding, a second digital signal d2, which reforms from the valid and corrected bit combinations Stp and Skp, respectively, the associated data D1, D2, D3, and D4 with "1", "0", "0", and "1", which are identical with the data of the original digital signal d0. The transmission error in the third bit combination has thus been corrected.

Figure 2:
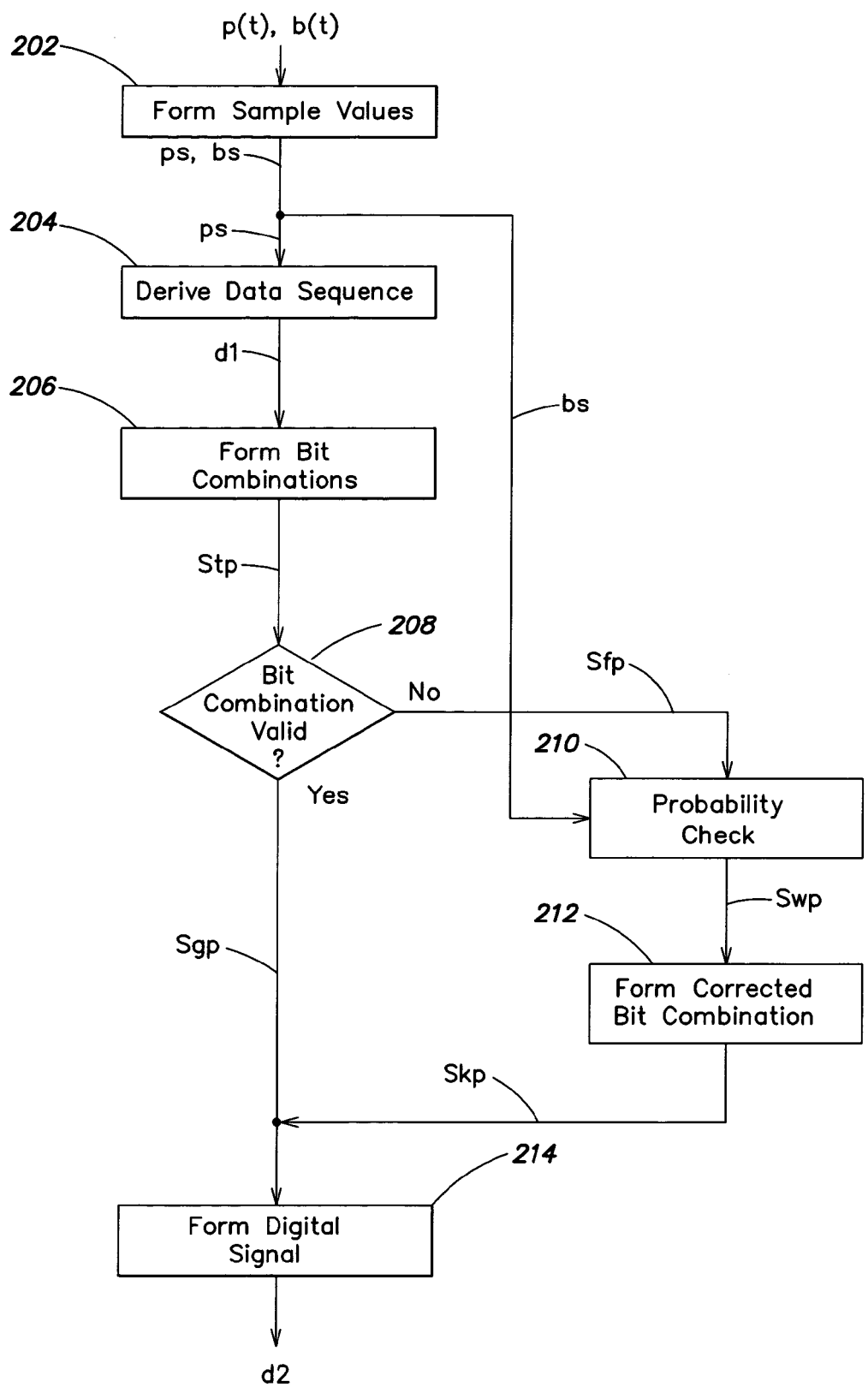
FIG. 2 is a flowchart of the decoding method.

FIG. 2 is a flow chart illustration of a decoding technique. The reference characters correspond to those in the timing diagram of FIG. 1. In a first step 202, phase sample values ps and magnitude sample values bs are formed from the biphase signal or its components p(t) and b(t), respectively. Since the individual steps of the method are preferably implemented as digital steps, the phase and magnitude sample values are formed from digitized sample values or are digitized in this first step at the latest. If the original sampling and digitization were done using oversampling, the first step 202 will include a decimation to form the desired phase and magnitude sample values. For the digital signal processing, a normalized range of −1 to +1 is generally used, with the individual values being given in two's complement form. The digitization of the phase sample values ps will become simpler if only the signs of the phase sample values are used for the subsequent processing.

In a second step 204, a data sequence that represents a digital signal dl is derived from the digitized phase sample values ps. According to the two states in the biphase signal, the digital signal dl contains two logic states in its bit sequence. The decision is determined by the signs of the sampled phase values ps.

In a third step 206, bit combinations Stp are formed from the bit sequence of the digital signal dl. Each bit combination is assigned to an original data value according to the coding at the transmitter end. In the dc-level-free coding method of the case of application being described, each bit combination Stp must have a bit change. In the case of the bits of adjacent bit combinations, this condition need not be fulfilled.

In a fourth step 208, a decision is made as to whether the bit combination Stp is a valid bit combination Sgp or an erroneous bit combination Sfp. This decision is based on the above-mentioned bit change in the bit combination Stp.

In a fifth step 210, the erroneous bit combination Sfp is subjected to a probability check. From the magnitude sample values bs, probability values are formed that decide which parts of the erroneous bit combination Sfp are probably true and/or which are probably false. As mentioned above, a comparison of the individual magnitude sample values bs provides the criterion for the statement as to which parts St1, St2 of the bit combination Sfp are probably true and/or which are probably false.

The probability check is followed by a sixth step 212, in which a corrected bit combination Skp is formed. The correction is simple, because only the false bit needs to be inverted, for example.

In a seventh step 214, an output decoder forms a second digital signal d2, whose data states are formed either from the valid bit combination Sgp or, in the presence of the erroneous bit combination Sfp, from the corrected bit combination Skp.

The processing mode during the correction can also be illustrated with the aid of the table of FIG. 3 by the example of four erroneous bit combinations. The five columns show the processing operations required, and the four rows give the examples for the four possible erroneous bit combinations. The first column contains numerical examples of the magnitude sample values $bs_0$ and $bs_{-1}$ of a bit combination Stp. The second column shows the logic states "0" or "1" of the first and second parts $St_0$, $St_{-1}$ of the bit combination Stp, which follow from the sample phase values $ps_0$ and $ps_{-1}$. In none of the four rows, a bit change occurs. The third column gives the difference Diff between the instantaneous magnitude sample values $bs_0$ and the delayed magnitude sample values $bs_{-1}$ of the first column. In addition, this column also shows the result of the comparison as "<0" or ">0". The fourth column shows the probability assessments of the two parts $Sw_0$ and $Sw_{-1}$ of the bit combination to be examined, Swp. The crossed-out logic states symbolize the presumably erroneous part. The states not crossed out symbolize the presumably valid part. The last column Skp shows the individual parts $Sk_0$ and $Sk_{-1}$ of the corrected bit combination Skp, from which the original state "0" or "1" can be decoded as in the case of a valid bit combination Sgp.

Although the present invention has been shown and described with respect to several preferred embodiments thereof, various changes, omissions and additions to the form and detail thereof, may be made therein, without departing from the spirit and scope of the invention.

What is claimed is:

1. A method of decoding biphase signals, comprising the steps of:
    in a first step, forming phase sample values and magnitude sample values from the biphase signal or its components;
    in a second step, deriving a first digital signal from the phase sample values according to a threshold criterion;
    in a third step, forming associated bit combinations from the first digital signal;
    in a fourth step, deciding whether each one of the bit combinations is a valid bit combination or an erroneous bit combination;
    in a fifth step, performing a probability check to obtain probability values that decide which parts of the erroneous bit combination are probably true and which are probably false;
    in a sixth step, generating a corrected bit combination by means of the probability values; and
    in a seventh step, forming a second digital signal whose data states are formed either from the valid bit combination or, in the presence of an erroneous bit combination, from the corrected bit combination.

2. The method of claim 1, where the probability values are formed using the magnitude sample values.

3. The method of claim 2, where in the case of the erroneous bit combination, the probability check utilizes at least two of the magnitude sample values such that the one of the at least two magnitude sample values with a greater value indicates a part of the erroneous bit combination that is true, and the other one of the at least two magnitude sample values with a lesser value indicates a part of the erroneous bit combination that is false.

4. A method of decoding a biphase signal, comprising the steps of:
    forming phase sample values and magnitude sample values from the biphase signal;
    deriving a first digital signal from the phase sample values according to a predetermined criterion;
    forming at least one bit combination from the first digital signal;
    deciding whether the at least one bit combination is a valid bit combination or an erroneous bit combination;
    if the bit combination is an erroneous bit combination, performing a probability check to obtain probability values that decide which part of the erroneous bit combination is true and which part of the erroneous bit combination is false, and generating a corrected bit combination from the obtained probability values for the false part of the erroneous bit combination; and forming a second digital signal whose data states are formed from the valid bit combination and, in the presence of an erroneous bit combination, from the corrected bit combination.

5. The method of claim 4, where the predetermined criterion comprises a threshold criterion.

6. The method of claim 4, where for the erroneous bit combination, the probability check utilizes at least two of the magnitude sample values such that one of the at least two magnitude sample values with a greater value indicates a part of the erroneous bit combination that is true, and another one of the at least two magnitude sample values with a lesser value indicates a part of the erroneous bit combination that is false.

7. The method of claim 4, where the step of forming phase sample values and magnitude sample values comprises the steps of sampling the biphase signal to obtain phase sample values therefrom and sampling the biphase signal to obtain magnitude sample values therefrom.

8. The method of claim 7, where the steps of sampling the biphase signal to obtain phase sample values and magnitude sample values are performed synchonously.

9. The method of claim 4, where the step of forming at least one bit combination from the first digital signal forms the at least one bit combination from two successive bits of the magnitude sample values.

10. The method of claim 4, where the step of generating a corrected bit combination from the obtained probability values changes the sign of the false part of the erroneous bit combination.

11. A method of decoding a biphase signal, comprising the steps of:
   sampling the biphase signal to obtain phase sample values therefrom;
   sampling the biphase signal to obtain magnitude sample values therefrom;
   deriving a first digital signal from the phase sample values;
   forming associated bit combinations from the first digital signal;
   deciding whether the bit combination is a valid bit combination or an erroneous bit combination;
   performing a probability check to obtain probability values that decide which parts of the erroneous bit combination are true and which are false;
   generating a corrected bit combination from the obtained probability values; and
   forming a second digital signal whose data states are formed from the valid bit combination and, in the presence of an erroneous bit combination, from the corrected bit combination.

12. The method of claim 11, where the steps of sampling the biphase signal to obtain phase sample values and magnitude sample values are performed synchonously.

13. The method of claim 11, where the step of deciding decides that a valid bit combination exists when a change in sign of the phase sample values occurs within the bit combination.

14. The method of claim 11, where the step of deciding decides that an erroneous valid bit combination exists when there is no change in sign of the phase sample values within the bit combination.

15. The method of claim 11, where the step of deriving derives the first digital signal from the phase sample values according to a predetermined criterion.

16. The method of claim 11, where the predetermined criterion comprises a threshold criterion.

17. The method of claim 11, where the step of forming associated bit combinations from the first digital signal forms a bit combination from two successive bits of the magnitude sample values.

18. The method of claim 17, where the step of deciding whether the bit combination is a valid bit combination or an erroneous bit combination compares the successive two bits of the magnitude sample values of the bit combination by subtracting one of the successive two bits from the other one of the successive two bits.

19. The method of claim 11, where in the case of the erroneous bit combination, the probability check utilizes at least two of the magnitude sample values such that the one of the at least two magnitude sample values with a greater value indicates a part of the erroneous bit combination that is true, and the other one of the at least two magnitude sample values with a lesser value indicates a part of the erroneous bit combination that is false.

20. The method of claim 11, where the step of generating a corrected bit combination from the obtained probability values changes the sign of the false part of the erroneous bit combination.

* * * * *